US012593823B1

(12) United States Patent

McAfee

(10) Patent No.: US 12,593,823 B1
(45) Date of Patent: Apr. 7, 2026

(54) SENSORY TRAINING DEVICE FOR SIMULTANEOUSLY PROVIDING A PLURALITY OF SENSES TO DOGS

(71) Applicant: Roseanna Graham McAfee, Cumming, GA (US)

(72) Inventor: Roseanna Graham McAfee, Cumming, GA (US)

( * ) Notice: Subject to any disclaimer, the term of this patent is extended or adjusted under 35 U.S.C. 154(b) by 0 days.

(21) Appl. No.: 19/085,542

(22) Filed: Mar. 20, 2025

(51) Int. Cl.
 A01K 15/02 (2006.01)

(52) U.S. Cl.
 CPC ..................................... *A01K 15/02* (2013.01)

(58) Field of Classification Search
 CPC ...................................................... A01K 15/02
 See application file for complete search history.

(56) References Cited

U.S. PATENT DOCUMENTS

| | | | | | |
|---|---|---|---|---|---|
| 2,746,644 | A | * | 5/1956 | Steiner | F41B 9/0075 |
| | | | | | 222/324 |
| 4,492,318 | A | * | 1/1985 | Luk | F41B 9/004 |
| | | | | | 239/587.5 |
| 5,170,779 | A | * | 12/1992 | Ginsberg | A61M 3/0208 |
| | | | | | 601/161 |
| 5,234,129 | A | * | 8/1993 | Lau | F41B 9/0068 |
| | | | | | 222/130 |
| 6,000,626 | A | * | 12/1999 | Futo | A46B 11/066 |
| | | | | | 239/526 |

| | | | | | |
|---|---|---|---|---|---|
| 6,247,995 | B1 | * | 6/2001 | Bryan | B05B 7/2472 |
| | | | | | 435/189 |
| 7,174,856 | B2 | * | 2/2007 | Neri | A01K 29/00 |
| | | | | | 119/718 |
| 7,674,153 | B2 | * | 3/2010 | King | A01K 15/02 |
| | | | | | 446/213 |
| 7,798,364 | B1 | * | 9/2010 | Eddins | F41B 11/62 |
| | | | | | 239/419 |
| 7,992,525 | B1 | * | 8/2011 | Fisher | A01K 15/02 |
| | | | | | 119/860 |
| 9,398,756 | B2 | * | 7/2016 | Eckert | B05B 11/1015 |
| 9,462,786 | B2 | * | 10/2016 | Mushenski | A01K 15/00 |
| 10,231,434 | B2 | * | 3/2019 | Eckert | A01K 15/02 |
| 10,234,233 | B1 | * | 3/2019 | Spikes | F41B 9/0037 |
| 11,076,579 | B2 | * | 8/2021 | Eckert | B05B 11/0037 |
| 11,178,851 | B2 | * | 11/2021 | Tomassetti | A61K 9/124 |
| 12,096,748 | B1 | * | 9/2024 | Eckert | B05B 11/0056 |
| 2005/0279288 | A1 | * | 12/2005 | Neri | A01K 15/02 |
| | | | | | 119/712 |

(Continued)

*Primary Examiner* — Jessica B Wong

(57) ABSTRACT

A sensory training device for simultaneously providing a plurality of senses to dogs is disclosed. The device includes a first cover member and a second cover member, wherein the first and second cover members being formed as individual sliced elements and attached together to form an outer cover. The device also includes a front cover attached to a side portion of the outer cover when the first and second cover members are attached together, wherein the front cover being configured with at least two holes. The device further includes a plug attached to a top portion of the outer cover. The device includes a water pump attached between the first and second cover members. The device also includes a trigger attached to front cover via the holes. The device further includes a hose attached to the lower portion of water pump to draw the water when the trigger is pressed.

11 Claims, 5 Drawing Sheets

(56)         References Cited

U.S. PATENT DOCUMENTS

| | | | |
|---|---|---|---|
| 2008/0072842 A1* | 3/2008 | King | A01K 15/02 |
| | | | 119/719 |
| 2011/0017149 A1* | 1/2011 | Mushenski | A01K 15/022 |
| | | | 119/719 |
| 2011/0232584 A1* | 9/2011 | Valencia | A01K 15/02 |
| | | | 119/719 |
| 2011/0232586 A1* | 9/2011 | Levy | A01K 27/004 |
| | | | 239/289 |
| 2012/0178338 A1* | 7/2012 | Mowbray | F41B 9/0065 |
| | | | 124/31 |
| 2013/0320038 A1* | 12/2013 | Carty | F41B 9/00 |
| | | | 222/79 |
| 2014/0261232 A1* | 9/2014 | Mushenski | A01K 15/00 |
| | | | 119/719 |
| 2014/0290794 A1* | 10/2014 | Gan | F04B 9/14 |
| | | | 141/51 |
| 2015/0373949 A1* | 12/2015 | Eckert | A01K 27/009 |
| | | | 119/712 |
| 2017/0071159 A1* | 3/2017 | Eckert | B05B 11/0038 |
| 2017/0142932 A1* | 5/2017 | Mainini | A01K 15/022 |
| 2017/0203343 A1* | 7/2017 | Poddar | B05B 7/0876 |
| 2018/0303066 A1* | 10/2018 | Weimin | A01K 15/021 |
| 2019/0054484 A1* | 2/2019 | Weimin | A01K 27/009 |
| 2019/0208747 A1* | 7/2019 | Eckert | B05B 11/0037 |
| 2020/0315137 A1* | 10/2020 | Tomassetti | A61K 9/124 |
| 2021/0236915 A1* | 8/2021 | Rudell | A63F 13/323 |

* cited by examiner

SENSORY TRAINING DEVICE FOR SIMULTANEOUSLY PROVIDING A PLURALITY OF SENSES TO DOGS

FIELD OF THE INVENTION

The present invention relates to dog training device and more particularly relates to a sensory training device for simultaneously providing a plurality of senses to dogs.

BACKGROUND OF THE INVENTION

Effective dog training often involves the use of various stimuli to capture the animal's attention and reinforce desired behaviors. Traditional training methods typically employ separate tools or techniques to engage the dog's senses. For example, visual cues might involve hand signals or brightly colored objects, auditory cues could include voice commands or clickers, olfactory stimuli might be provided by treats or scented items, and tactile feedback could be delivered through physical touch or vibration collars.

However, relying on multiple tools and techniques can complicate the training process. Trainers often find themselves juggling different devices, which can lead to inconsistencies in training and reduced effectiveness. Furthermore, some training tools may only engage one or two of the dog's senses, limiting their ability to fully capture the dog's attention or reinforce specific behaviors.

In addition, many dogs can become desensitized to certain stimuli if they are not varied or combined effectively. For instance, a dog that becomes accustomed to a clicker might begin to ignore it if not paired with other forms of reinforcement. Similarly, visual cues may be less effective in certain environments where distractions are present.

Research in animal behavior has shown that multi-sensory engagement—where multiple senses are stimulated simultaneously—can significantly enhance learning and retention in animals, including dogs. By engaging more than one sense at a time, trainers can create a stronger association between the stimulus and the desired behavior, which may lead to more effective training outcomes.

Despite this understanding, there is a lack of integrated training devices that can simultaneously provide multi-sensory engagement in a convenient and user-friendly form. Existing devices either focus on one or two senses or require the trainer to switch between different tools, which can disrupt the flow of the training session and reduce its effectiveness.

Hence, there is a need for a device that addresses above drawbacks by providing single, easy-to-use training device that can engage a dog's sight, sound, smell, and touch senses simultaneously, which is unmet by existing products.

BRIEF SUMMARY OF THE INVENTION

It is an object of the present invention to provide a sensory training device that simultaneously engages a dog's sight, sound, smell, and touch senses to enhance the effectiveness of training.

It is another object of the present invention to provide a training device that is easy to use, combining multiple sensory stimuli into a single, compact tool.

It is a further object of the present invention to spray a scented liquid that dogs find unpleasant for aiding in the correction of undesirable behaviors.

It is another object of the present invention to design the spray device in a color, which the dogs can see to ensure the device is easily visible during training sessions.

It is further object of the present invention to generate an auditory cue, specifically a loud clicking sound, which grabs the dog's attention and reinforces commands during training.

It is a further object of the present invention to provide a training tool that allows trainers to deliver immediate, multi-sensory feedback, improving the dog's learning and retention of commands.

It is an object of the present invention to ensure that the sensory training spray gun is ergonomically designed for ease of use and effective operation during training sessions.

According to embodiment of the present invention, a sensory training device for simultaneously providing a plurality of senses to dogs. The device includes a first cover member and a second cover member, wherein the first and second cover members being formed as individual sliced elements and attached together to form an outer cover. The device also includes a front cover attached to a side portion of the outer cover when the first and second cover members are attached together, wherein the front cover being configured with at least two holes. The device further includes a plug attached to a top portion of the outer cover. The device includes a water pump attached between the first and second cover members. The device also includes a trigger attached to front cover via the holes. The device further includes a hose attached to the lower portion of water pump to draw the water when the trigger is pressed.

BRIEF DESCRIPTION OF DRAWINGS

The present invention will become clearly understood to those of ordinary skill in the art when descriptions of exemplary embodiments thereof are read with reference to the accompanying drawings.

DETAILED DESCRIPTION OF THE INVENTION

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. For a more complete understanding of the present invention, reference is now made to the following descriptions taken in conjunction with the accompanying drawings.

Figure 3:
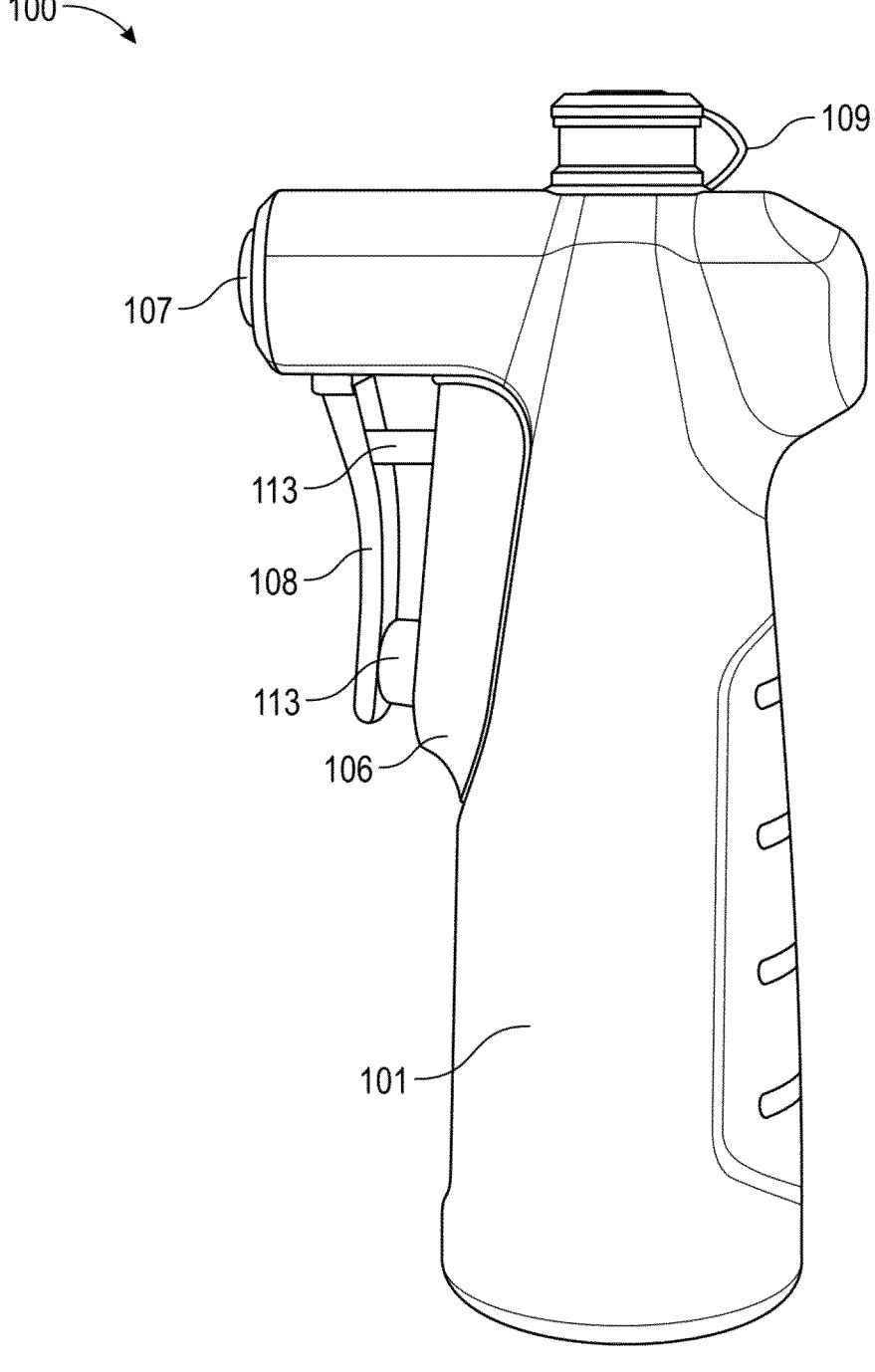
FIG. 3 is a side view of the sensory training device of FIG. 1.
Figure 4:
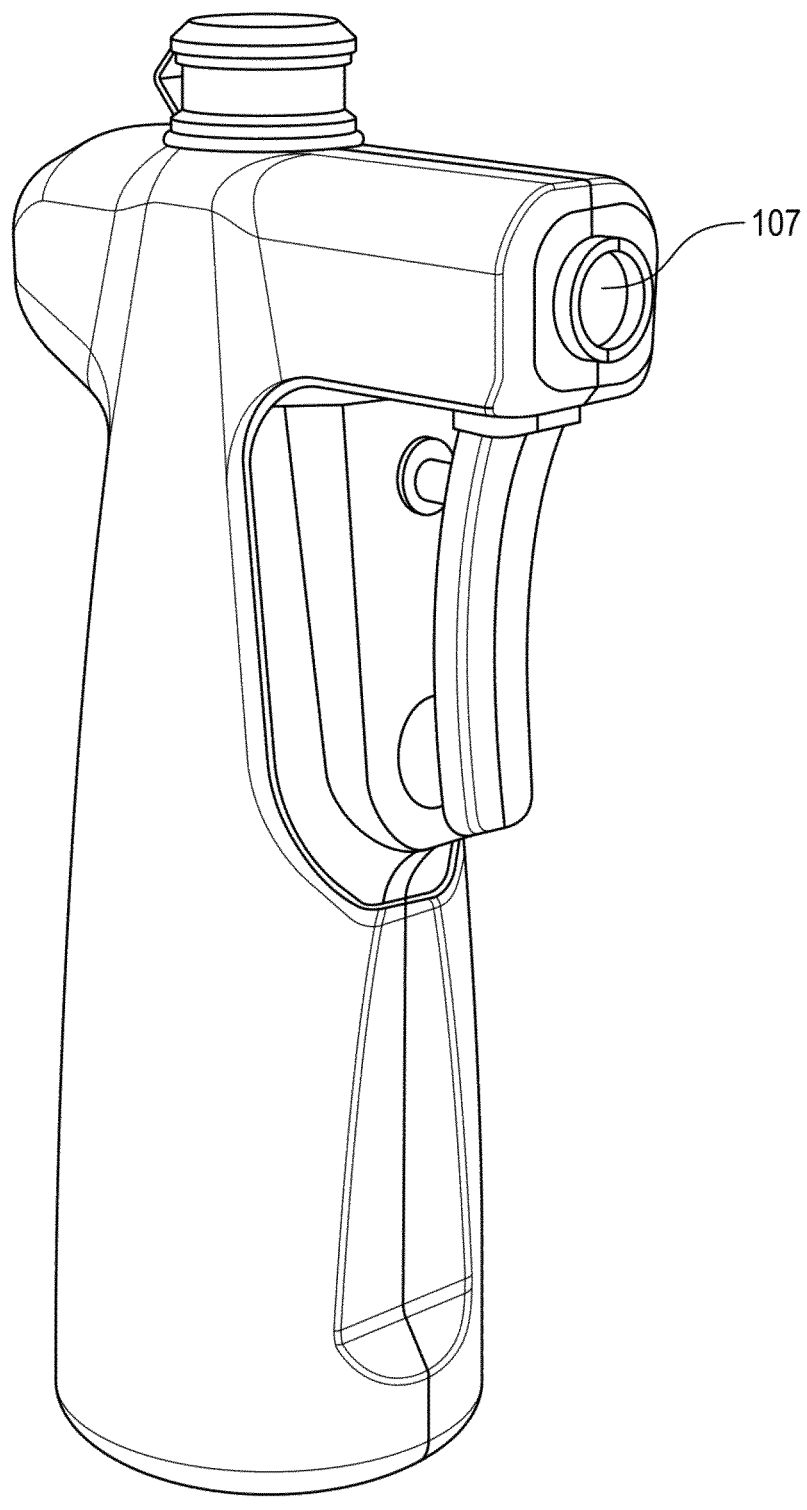
FIG. 4 is another side view of the sensory training device of FIG. 1.
Figure 5:
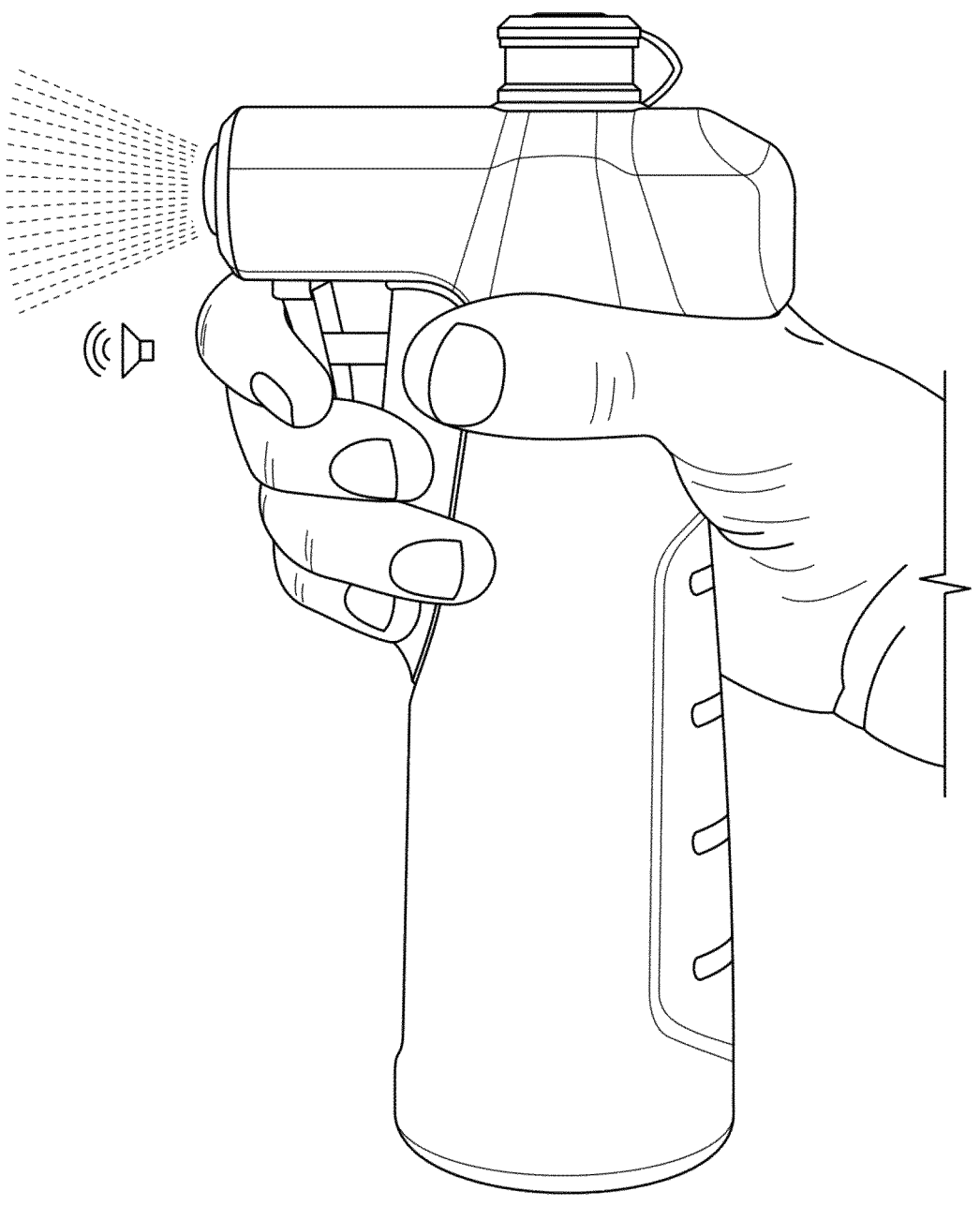
FIG. 5 is a schematic view of the sensory training device of FIG. 1 when in use.

The present invention disclosed herein is a sensory training device 100, as shown in FIGS. 3, 4 and 5, designed as a spray gun, for training animals, such as but not limited to dogs. The device 100 acts as a multi-sensory training tool that engages a dog's senses of sight, sound, smell, and touch simultaneously, thereby enhancing the effectiveness of training sessions. FIG. 3 shows the components of the device 100 which are externally visible.

Figure 1:
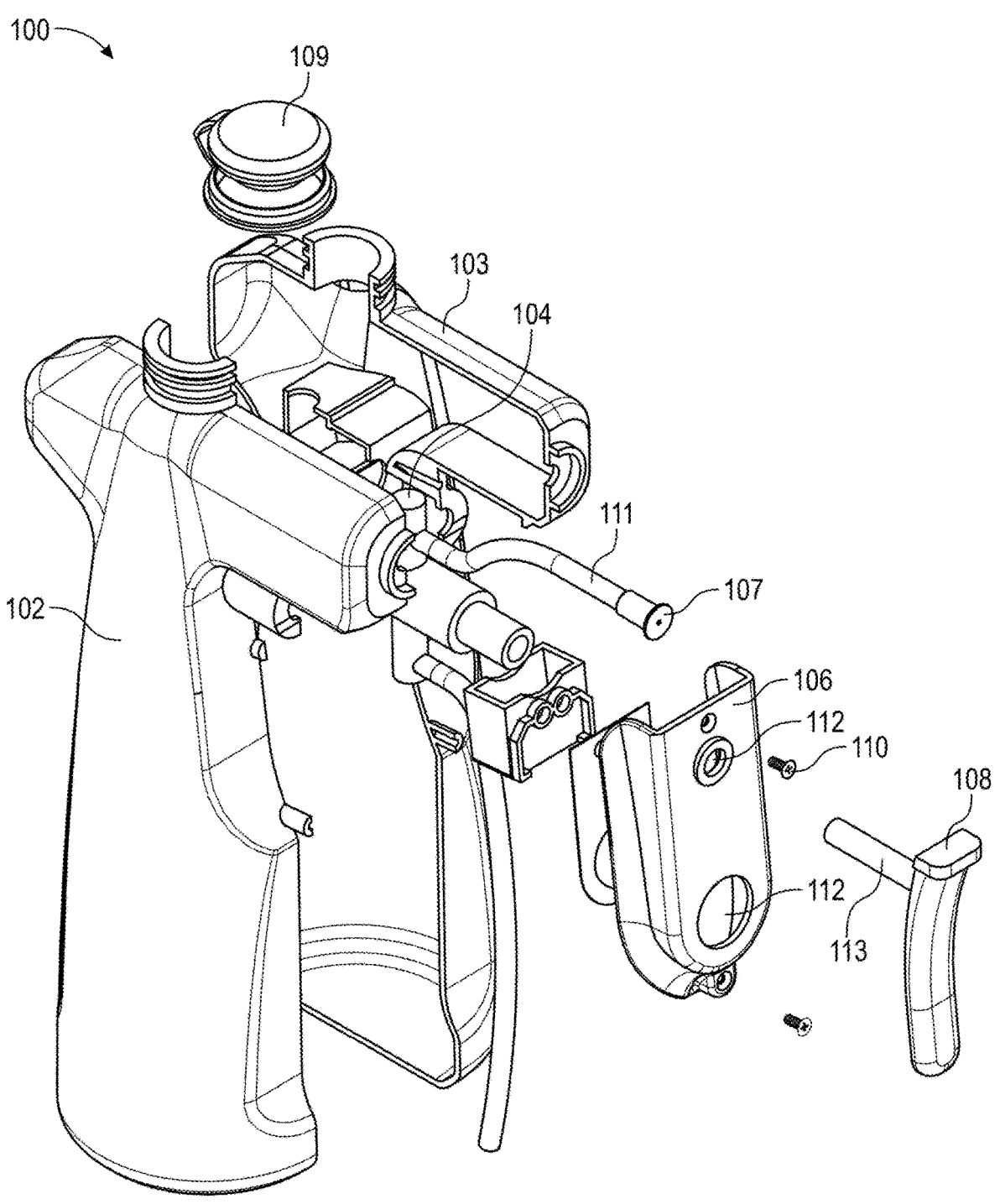
FIG. 1 is an exploded view of a sensory training device according to an embodiment of the present invention.

For a more detailed understanding of the invention, referring FIG. 1 showing exploded view of the device 100. The main body of the device 100 consists of an outer cover 101 formed by two separate components including a first cover member 102 and a second cover member 103. The cover members 102, 103 are designed as individual sliced elements, which are attached together to form the outer cover 101. The cover members 102, 103 are attached together by means of one or more connecting elements, or by welding or by means of threaded arrangement. This two-part construction allows for easy assembly and access to internal components. A front cover 106 is attached to a side portion of the outer cover 101 once the first and second cover members 102, 103 are attached together. In one aspect, the front cover 106 is attached to the outer cover 101 using one or more connecting elements 110. The connecting elements 110 include but not limited to screws and nuts, threaded rods, bolts and pins, and any other similar fastening elements.

A plug 109 is attached to the top portion of the outer cover 101. In one aspect, the plug 109 is designed to fit into an opening that is configured on the top portion of the outer cover 101. The opening serves two primary purposes such as allowing for the addition of liquid to the device 100 and enables the introduction of scents, such as citrus scent, to enhance the olfactory stimulation for the dog. In specific aspect, the plug 109 acts as a closure for this opening to secure the liquid during use.

In an exemplary aspect, a water pump 104 is positioned between the first and second cover members 102, 103 when they are attached together. The water pump 104 includes a pipe 111 that protrudes out of the attached cover members 102, 103, extending above the trigger 108 area. At the end of this pipe 111, a nozzle 107 is attached for liquid dispersal. In one aspect, a trigger 108 is attached to the front cover 106. The front cover 106 includes at least two holes 112. The trigger 108 includes at least two tubes 113 which when inserted into holes 112 of the front cover 106, the tubes are movably positioned, such that when the trigger 108 is pressed, sound is produced to alert dogs. The trigger 108 serves as the activation mechanism for the device 100. In one aspect, the top portion of the trigger 108 is movably attached into the side portion of the outer cover 101.

Figure 2:
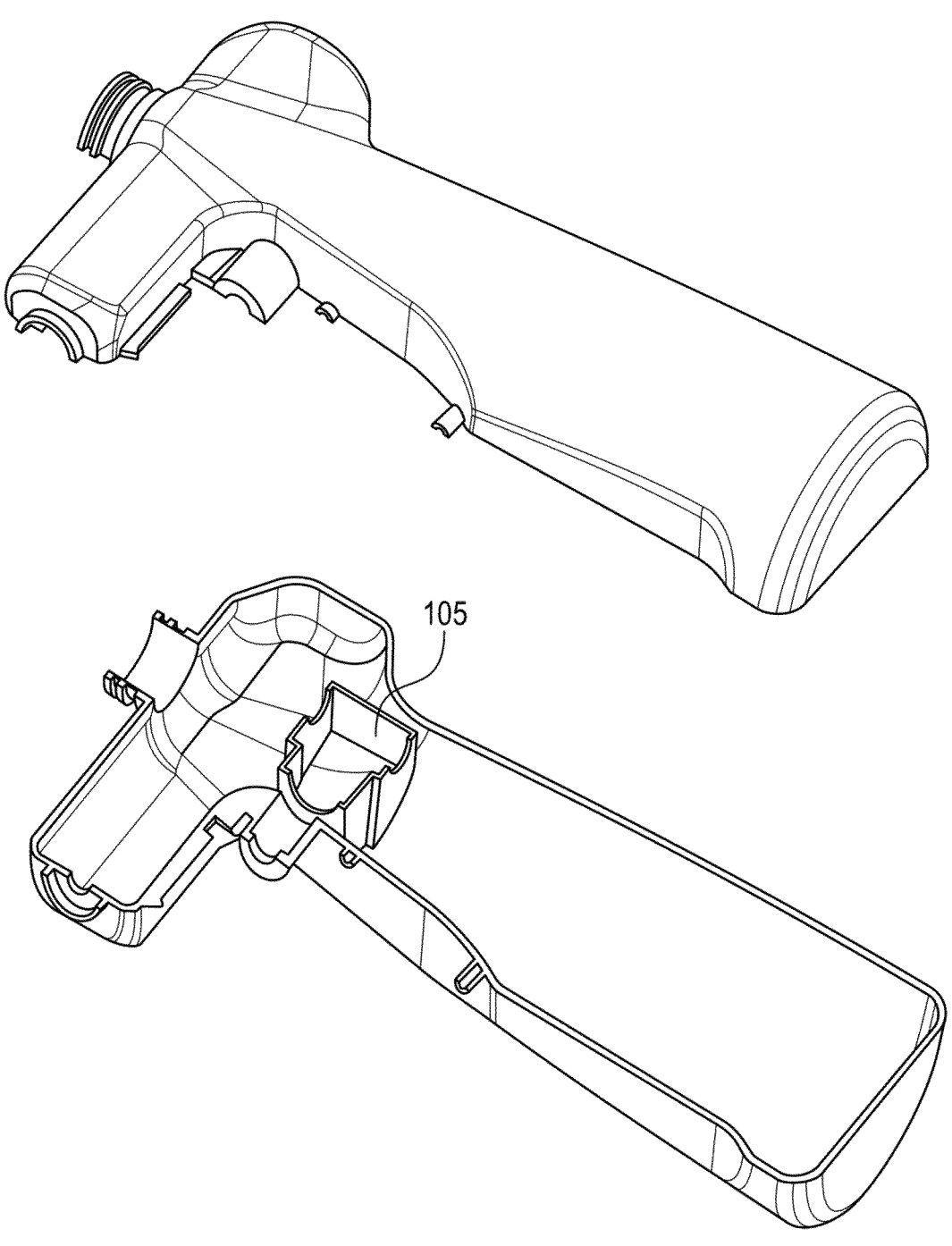
FIG. 2 is another exploded view of the sensory training device of FIG. 1 showing only a locking mechanism.

Further, the device 100 includes a hose attached to the lower portion of the water pump 104. This hose is responsible for drawing water (or other liquids) from the device 100's reservoir when the trigger 108 is pressed. In one aspect, the central part of both the first and second cover members 102, 103 includes a locking mechanism 105, as shown in FIG. 2, such that the water pump 104 is securely held in place when the two cover members 102, 103 are attached together which in turn ensures stable and consistent operation of the device 100.

In one embodiment, the sensory training device 100 is operated using following method: the device 100 is filled with liquid through the opening on the top of the outer cover 101. The opening is secured with the plug 109. When the trigger 108 is pressed, the water pump 104 is activated. Then the liquid is drawn by the water pump 104 via the attached hose. The liquid is then pumped through the pipe 111 that protrudes through the cover 101. Finally, the liquid is sprayed out through the nozzle 107 at the end of the pipe 111. This action creates a multi-sensory experience for the dog: sight, sound, smell and touch, which means the dog sees the spray of liquid, the operation of the pump 104 and the spray creates auditory stimulation, if scented liquids are used, it provides olfactory engagement and the spray of liquid provides tactile stimulation, respectively.

The ability to add different liquids and scents through the top opening allows for customization of the sensory experience. This feature enables trainers or owners to modify the stimuli to individual dogs' preferences or training needs.

The advantages of using present invention include the following: By simultaneously stimulating multiple senses, the device 100 provides engaging experience for dogs, thereby enhancing the effectiveness of training sessions. The trigger 108 mechanism allows for direct interaction between the user and the dog, thus facilitating guided training sessions. The ability to use different liquids and scents allows for a variety of training scenarios and caters to individual dogs' preferences. Further, the two-part cover design allows for easy access to internal components for cleaning or maintenance. The device 100 is also used for various purposes, including obedience training, scent work, or used for mental stimulation and enrichment.

Further, this multi-sensory engagement is designed to reinforce commands given by the trainer. The unpleasant citrus scent acts as a negative reinforcement, while the combination of sound and visual cues helps to capture and maintain the dog's attention. Trainers may use this device 100 to accompany any command with the immediate sensory feedback helping the dog associate the command with the desired behavior or correction.

The sensory training device 100 is significantly advantageous by integrating multiple sensory stimuli into the single device 100. This integration also enhances convenience, as trainers no longer need to juggle multiple tools during a session. The device 100's effectiveness in behavioral correction is increased by the citrus scent deterrent, while its yellow color ensures high visibility to dogs. Additionally, the auditory cue provided by the clicking sound adds another layer of sensory engagement, further aiding in the training process.

Therefore, the combination of visual, auditory, olfactory, and tactile stimuli in a single, easy-to-use device 100 improves the way dogs are trained, while providing a more efficient and effective method for both professional trainers and dog owners alike.

It will finally be understood that the disclosed embodiments are presently preferred examples of how to make and use the claimed invention, and are intended to be explanatory rather than limiting the scope of the invention as defined by the claims below. Reasonable variations and modifications of the illustrated examples in the foregoing written specification and drawings are possible without departing from the scope of the invention as defined in the claim below. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art, and within the scope of any claims that the above disclosure supports. The scope of the invention is accordingly defined by the following claims.

This application is intended to cover any adaptations or variations of the present invention. Therefore, it is manifestly intended that this invention be limited only by the claims and the equivalents thereof.

The invention claimed is:

1. A sensory training device for simultaneously providing a plurality of senses to dogs, the device comprising:

a first cover member and a second cover member, wherein the first and second cover members being formed as individual sliced elements and attached together to form an outer cover;

a front cover attached to a side portion of the outer cover when the first and second cover members are attached together, the front cover being configured with at least two holes;

a plug attached to a top portion of the outer cover;

a water pump attached between the first and second cover members;

a trigger attached to the front cover via the holes; and a hose attached to the lower portion of water pump to draw the water when the trigger is pressed.

2. The sensory training device of claim 1, wherein the first and second cover members are attached together by using a plurality of connecting elements.

3. The sensory training device of claim 1, wherein the trigger includes at least two tubes which when inserted into holes of the front cover, the tubes are movably positioned, such that when the trigger is pressed, sound is produced to alert dogs.

4. The sensory training device of claim 1, wherein the plug is attached to an opening configured on the top portion of the outer cover.

5. The sensory training device of claim 1, wherein the plug is used as a closure for the opening.

6. The sensory training device of claim 4, wherein the opening is provided for pouring liquid or adding scent.

7. The sensory training device of claim 1, wherein a part of the water pump includes a pipe that protrudes out of the first and second cover, and above the trigger, when the first and second cover members are in attached condition.

8. The sensory training device of claim 7, wherein the water pump includes a nozzle at the end of the pipe.

9. The sensory training device of claim 1, wherein when the trigger is pressed by a user, the water pump pumps liquid from via the hose and sprays the liquid via the nozzle.

10. The sensory training device of claim 1, wherein the central part of the first and second cover members each includes a locking mechanism to hold the water pump in place when the first and second cover members are attached together.

11. The sensory training device of claim 1, wherein the plurality of senses include sight, sound, smell, and touch.

* * * * *